July 12, 1955 G. W. WILLITS Re. 24,037
HOLDER
Original Filed June 18, 1951
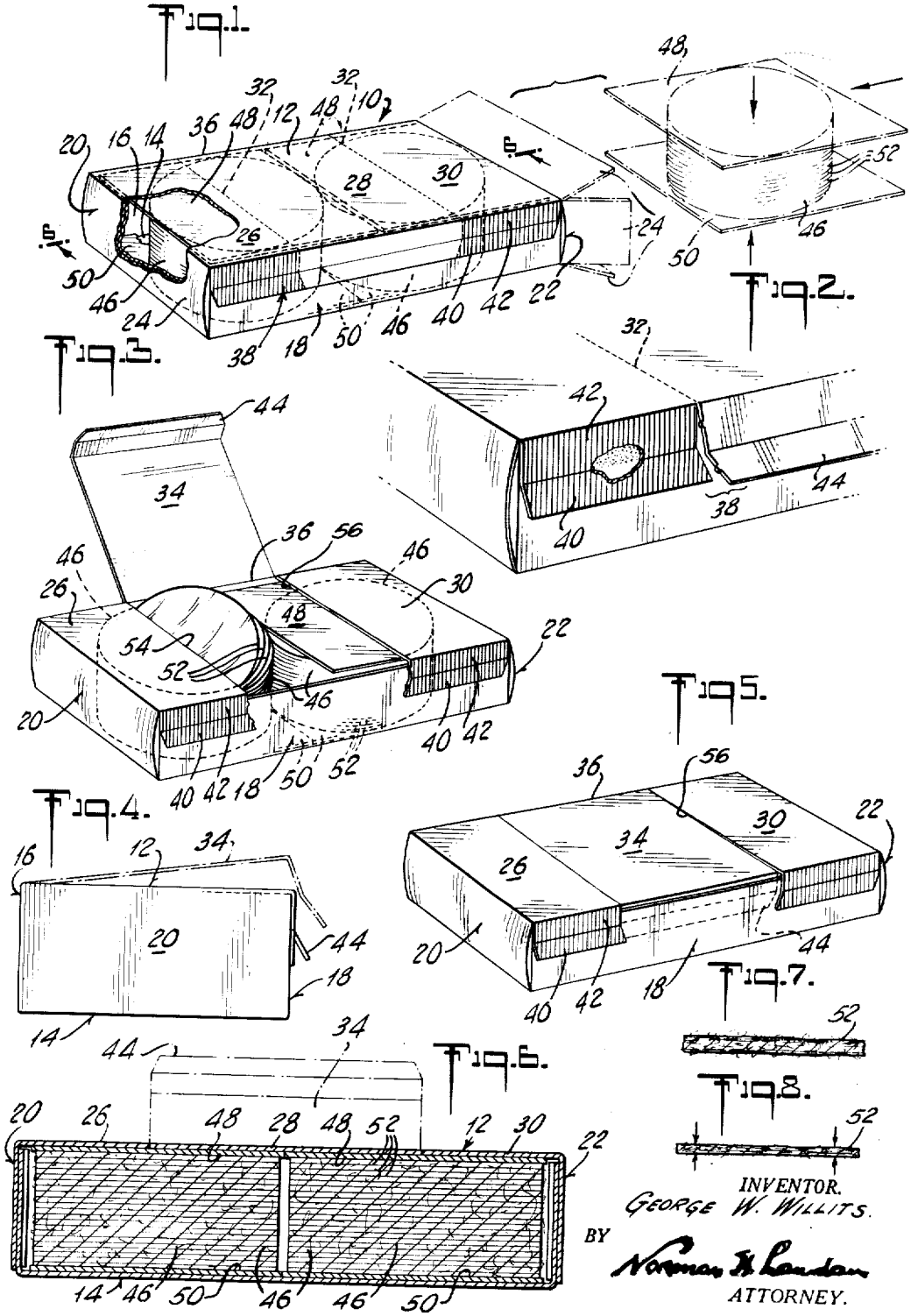
INVENTOR.
GEORGE W. WILLITS.
BY Norman H. Landau
ATTORNEY.

United States Patent Office

Re. 24,037
Reissued July 12, 1955

24,037

HOLDER

George W. Willits, Hinsdale, Ill., assignor to Johnson & Johnson, a corporation of New Jersey Original No. 2,689,643, dated September 21, 1954, Serial No. 232,231, June 18, 1951. Application for reissue January 25, 1955, Serial No. 484,091

2 Claims. (Cl. 206—57)

Matter enclosed in heavy brackets [ ] appears in the original patent but forms no part of this reissue specification; matter printed in italics indicates the additions made by reissue.

The present invention relates to a filter pad holder of a type adapted to facilitate the sanitary removal of individual filter pads therefrom.

A container of a certain type, employed especially for filter pads, comprises a rectangular box-like structure, made of relatively cheap material, in which two stacks of compressed filter pads, used in filtering fluids, or more particularly milk on dairy farms or the like, are stored until ready for use.

Another object of my invention is to provide a container having a plurality of stiff top and bottom members, in between which stacks of filter pads are held under compression, said stiff top members providing individual protective interior coverings for the filter pad stacks, one such stack being protected and kept covered during the extraction and depletion of the other stack.

A further object, is to have a filter holder which will render the topmost filter pad easily accessible for individual and successive removal.

One particular object of this invention is to provide a filter pad holder of comparatively simple construction which is provided with a gripping flap extending over its upper central portion and which may be easily distinguished from the adjacent flap areas of the container, thereby permitting less visual concentration to locate the gripping tab for initial opening of the container.

Another and more general object is to provide an improved filter pad holder, practical to the point of simplicity, and in which filter pads are stored, and extracted, in a most satisfactory and sanitary manner.

In this specification and accompanying drawings I have shown and described preferred embodiments of my invention, but it is to be understood that these are not intended to be exhaustive nor limiting of the invention but on the contrary, are given for purposes of illustration in order that others skilled in the art may understand the principles thereof and in the manner of applying it to various forms.

The principles and various other objects of my invention will be more apparent from the following description and inspection of the accompanying drawings in which, Fig. 1 is a perspective view of a completely sealed filter holder, showing in dot and dash lines its right hand, end flaps flared open to receive a compressed stack of filter pads, parts being broken away and in cross section;

Fig. 2 illustrates in perspective and on an enlarged scale a fragmental portion of Fig. 1 showing the gripping tab of a hinged cover member partially severed, preparatory to being swung fully open as shown in Fig. 3;

Fig. 3 is a perspective similar to Fig. 1 showing a hinged cover member swung fully open after severance along lines of perforations;

Fig. 4 shows on an enlarged scale an end view of the filter holder looking from the left of Fig. 1;

Fig. 5 is a perspective view similar to Fig. 1 which shows the hinged cover closed and its gripping tab tucked inside of the container;

Fig. 6 is a horizontal cross-section on an enlarged scale taken along line 6—6 of Fig. 1;

Fig. 7 shows a fragmental cross-section on an enlarged scale of an individual filter pad in its natural uncompressed fluffy state; and Fig. 8 is a view similar to Fig. 7 showing the filter pad compressed as seen in Fig. 1.

Referring now to Figures 1, 2, 3, 4, 5 and 6 of the drawings, the container herein shown, is of the type especially employed for filter pads, and comprises a rectangular box-like structure 10 completely sealed, and having relatively wide top and bottom portions 12 and and 14 respectively, and relatively narrow sides 16 and 18 respectively, and sealed ends 20 and 22 respectively. The sealed ends 20, 22 comprising conventional sealing flaps 24, one or both of said ends 20, 22 which may be left temporarily unsealed, as best shown in dot and dash lines at the right hand end of the container 10 of Fig. 1 for the insertion therethrough of one or more stacks of fluffy resilient filter pads, which will later be described.

The top portion 12 of the container 10, referring more particularly to Fig. 1 comprises three panels 26, 28 and 30 respectively, divided in this instance and as illustrated, by two special parallel lines of perforations 32 extending transversely across the container top 12 to define a central portion 28 thereof adapted *in the future, i. e.,* when separated along such lines of perforations 32, to provide a hinged cover *or lid portion* 34, said cover *or lid portion* being hinged along its rear edge thereof as at 36 and best shown in Figure 3.

The container top 12 is scored to form a downwardly overlapping sealing flap 38, said flap 38 comprising two laterally co-extending outer and inner areas 40 and 42 respectively, the inner area 42 being adhesively secured along one of the relatively narrow sides 18 of the container 10 in its normally unopened state (see Fig. 2). The centrally located portion of the outer area 40 of said flap 38, as defined by said lines of perforations 32 being adapted to form a gripping tab 44 for the hinged cover 34, said lines of perforations 32 defining the gripping tab 44 and its adjacent inner area, having less perforations per inch but longer perforations to facilitate a quick opening action.

In the illustrations of Figures 2 and 3, two stacks of originally fluffy, voluminous and resilient filter pads 46 are shown, compressed between two pairs of relatively stiff top and bottom members 48 and 50 respectively. Such a stack of compressed filters is shown in dot and dash lines to the right of Fig. 1 and in a position to be inserted through the open flaps 24 of the end 22 prior to sealing.

As will be seen from the drawing the relatively stiff top and bottom members 48 and 50 are placed within the container 10 and between the top 12 and the bottom 14 of said container, and in adjacent and abutting relation to one another, said abutting relation being along the vertical, transverse center plane passing through the container.

The individual filter pads 52 (see Figs. 7 and 8) comprising said stacks 46, and shown herein as circular in contour, are made of unwoven material such as cut from superimposed thin fluffy webs of carded cotton fibers having, for example, 100 to 600 grains per square yard, and by weight 7 to 10 square yards to the pound, the fibers are processed and bleached, then run through a starch bath before baking in an oven, the resultant web of unwoven material from which the filter pads are cut, is therefore, one of voluminous, resilient and a fluffy texture, having upper and lower surfaces slightly denser and less fluffy than its interior fibers, which facilitates the easy extraction of the topmost filter pad from the rest of the stack when under compression.

A stack of filter pads may vary, by way of example from [600] *60* to [1000] *100* pads for a 6" stack, in their natural uncompressed state, said stack being compressible to a fraction of its former height, for example to about 2½".

In Figure 3 it will be seen that the stacks 46 of originally fluffy, voluminous and resilient filter pads 52, substantially fill the container 10. The central panel 28 of container top 12 is shown separated along its lines of perforations 32, and now serves as a hinged cover 34, said cover when swung open, exposes the abutting end portions of the top sheet members 48. In the illustration, one of the top sheet members 48 has been extrected, exposing in turn a substantial portion of the topmost filter pads for their successive removal from the container 10, and whereby the container top end panels 26 and 30 assume the function of holding the stack portions therebelow under compression, and the exposed and freed portion of said stack is caused to expand and reassume their original fluffy characteristics. Edges 54 and 56 formed along said lines of perforations 32 by the separation of the centerpanel 28 from the adjacent panels 26 and 30, thus cause the freed topmost filter pads to fan and project above the container top and present the topmost pads for individual gripping and removal.

As shown best in Figs. 1, 2, 3 and 5 the downwardly overlapping sealing flap 38 is divided into a central flap portion and adjacent flap portions along aforesaid lines of perforations 32, said central flap portion having contrasting characteristics, with respect to its adjacent end flap portions, such as line shading, arrows, shaped flaps or as in this disclosure by color contrast. This visual means of identification of the gripping tab from the adjacent flap portions is a distinct advantage to the operator.

As will be fully appreciated by the operators using this filter container, other advantages for opening and gripping said gripping flap 44 will become apparent. In conventional containers of a similar type it has always been a problem to initiate severance of overlapping sealing flaps, such as along aforesaid lines of perforations 32. Some containers have for instance their overlapping, combined sealing and gripping flaps comprising a single area adhesively secured to the container along its side, thereby making it difficult to initiate any opening action other than by tearing. Other types rely on lines of perforations only, whereby external pressure such as by the use of thumbs is necessary to initiate severance along its lines of perforations. Undue pressure may, and frequently does, tear or fracture the sidewall of said containers, thereby subjecting its contents to contamination from outside sources due to such fracture.

As best shown in Figs. 2 and 4 and particular reference to Fig. 4 being made, it will be easily understood that by slight pressure inwardly, on the relatively narrow flexible side wall 18 below the gripping flap 44, by the rear faces of the operator's finger tips, will cause a separation or pocket, to be formed between said gripping flap 44 and the underlying side wall 18, into which the operator's finger tips may readily be inserted for gripping the tab 44, thereby permitting a positive grip to be made between the finger tips and thumb, prior to severance along said lines of perforations 32.

Referring to Fig. 5 the filter pad container shown therein has been temporarily closed after use, and it is preferable, although not absolutely necessary, to reinsert the relatively stiff upper member as a protective inner cover, to further ensure the unused portion of the filter stacks against infiltration of foreign matter, such as dust, hair, oil slick or the like, and contamination from handling. It will be seen that the central flap and gripping tab portion 44, may be inserted when closed, and held in frictional contact with the inner face of the narrow side 18, thus providing a sanitary and relatively snug closure member.

It is not infrequent that during shipment of such containers, one or more of the containers get distorted or misshapened, in such cases the hinged cover 34 when opened tends to assume an unnatural angle with respect to its lines of severance, or edges 54 and 56; to facilitate the easy closing of such a misaligned cover, inclined edges of the gripping tab 44 converge towards the gripping portion of said cover, said inclined edges being adapted to cam on the edges 54 or 56, of the container top when closing said cover, to realign said cover along its lines of severance, and ensure proper closure of the hinged cover 34.

In use, a filter pad holder of the type herein described, is usually placed within easy reach of the operator. However, other means, such as a holder, or frame affixed to a wall may be used, several of which are commercially available, thereby permitting the free use of one hand while extraction of a filter pad by the other is accomplished. It will be understood, however, that this container support forms no part of the present invention and is used only by way of example.

Various modifications and additional applications will suggest themselves to those skilled in the art. The embodiment shown is only by way of illustration, and not in a limiting sense; all modifications within the scope of this invention are intended to be covered in the appended claims.

What is claimed is:

*1.* A filter disk package adapted to facilitate sanitary storage, transportation and removal of individual filter disks therefrom, comprising a pre-formed box-like completely sealed sanitary container having all rectangular surfaces, spaced perforated lines across the container top to define a future hinged closure and a stationary disk retaining portion of said top, said closure when opened along said lines providing access to the interior of the filter container, at least one stack of compressed originally fluffy, voluminous and resilient filter disks within the container, the aperture formed by opening of said closure being of dimension to expose a sufficient part of said stack of filter disks to permit finger grasping and removal, the exposed portions of said disks being in a relatively uncompressed state so that the topmost filter disk projects beyond the top of the container, the stationary portions of said top being of sufficient dimension to retain the unexposed portions of said stack of disks within the container and in compressed condition during removal of the topmost disks but said stationary portions being sufficiently small to permit removal of the topmost disks without injury to the disks during removal, a perforated edge of said aperture serving as a pivot line along which the freed stack portions are caused by reason of their expanded state to project beyond the top of the container and present the topmost filter disk for individual gripping and removal.

*2. A package of originally fluffy, voluminous and resilient disks adapted to facilitate sanitary storage and transportation thereof and the removal of individual disks from the package, said package comprising a preformed box-like, completely-sealed sanitary container having top and bottom members between which a stack of such originally fluffy, voluminous and resilient disks is confined in compressed form, said top member including a stationary portion and a future-hinged closure portion defined in part by perforated lines and adapted when opened along said lines to give access to the interior of the container, said disks, when the closure is opened along said perforated lines, being retained under compression in that part of the stack which is in the vicinity of said stationary portion, and being relieved of compression in that part of the stack which is in the vicinity of the opened closure portion, the normal resiliency of the disk material being such as to cause those disks at the top of the stack*

*to bend about an edge of the stationary top portion contiguous to the hinged portion and to spring upwardly beyond the top of the container in that part of the stack wherein compression is relieved, the dimensions of the stationary portion of the top member being sufficiently large to maintain the stack in the vicinity thereof under compression while the topmost disks are removed but sufficiently small to permit removal of the topmost disks without injury during such removal, and the dimensions of the hinged closure member being such that those portions of the disk at the top which spring upwardly are sufficiently large to facilitate finger grasping thereof and the removal of the disks from the container.*

References Cited in the file of this patent or the original patent

UNITED STATES PATENTS

| | | |
|---|---|---|
| 1,523,685 | Cohn | Jan. 20, 1925 |
| 2,122,480 | Lowey | July 5, 1938 |
| 2,125,042 | Bergstein | July 26, 1938 |
| 2,181,837 | Snyder et al. | Nov. 28, 1939 |
| 2,246,484 | Frieders | June 17, 1941 |
| 2,309,795 | Siegel | Feb. 2, 1943 |
| 2,354,186 | Donahue | July 25, 1944 |

Disclaimer

Re. No. 24,037.—*George W. Willits*, Hinsdale, Ill. HOLDER. Patent dated July 12, 1955. Disclaimer filed Apr. 6, 1956, by the assignee, *Johnson & Johnson.*

Hereby enters this disclaimer to claims 1 and 2 of said patent.

[*Official Gazette May 8, 1956.*]